United States Patent [19]

Hesser

[11] Patent Number: 4,831,540
[45] Date of Patent: May 16, 1989

[54] CONTROL SYSTEM FOR MOBILE TRANSPORTING UNITS ON TRANSPORTING LINES

[75] Inventor: Paul Hesser, Freiberg, Fed. Rep. of Germany

[73] Assignee: Robert Bosch GmbH, Stuttgart, Fed. Rep. of Germany

[21] Appl. No.: 23,554

[22] PCT Filed: Mar. 22, 1986

[86] PCT No.: PCT/DE86/00125
§ 371 Date: Jan. 2, 1987
§ 102(e) Date: Jan. 2, 1987

[87] PCT Pub. No.: WO86/06303
PCT Pub. Date: Nov. 6, 1986

[30] Foreign Application Priority Data

May 2, 1985 [DE] Fed. Rep. of Germany ....... 3515698

[51] Int. Cl.⁴ .............................................. B65G 35/00
[52] U.S. Cl. ................................ 364/468; 364/474.01; 364/478
[58] Field of Search ........... 364/468, 469, 478, 474.01, 364/475, 513, 474; 340/825.22, 825.23, 673, 680

[56] References Cited

U.S. PATENT DOCUMENTS

| 4,472,783 | 9/1984 | Johnstone et al. | 364/478 |
| 4,564,102 | 1/1986 | Mori et al. | 364/478 |
| 4,630,216 | 12/1986 | Tyler | 364/478 |
| 4,641,245 | 2/1987 | Dziggel | 364/478 |
| 4,646,245 | 2/1987 | Prodel et al. | 364/478 |
| 4,654,512 | 3/1987 | Gardosi | 364/468 |
| 4,658,371 | 4/1987 | Walsh et al. | 364/478 |
| 4,669,047 | 5/1987 | Chucta | 364/478 |
| 4,697,239 | 9/1987 | Siand et al. | 364/468 |

FOREIGN PATENT DOCUMENTS

| 0088591 | 9/1983 | European Pat. Off. . |
| 0103730 | 3/1984 | European Pat. Off. . |
| 3331694 | 3/1985 | Fed. Rep. of Germany . |
| 8500454 | 1/1985 | World Int. Prop. O. . |

Primary Examiner—Michael R. Fleming
Attorney, Agent, or Firm—Walter Ottesen

[57] ABSTRACT

A control system for mobile transporting units on a transporting line having a plurality of stations is proposed, through at least some of which stations the transporting units (15) travel in succession. A plurality of stationary control modules (21) on the transporting line (10) that are associated with the stations (18, 19, 20) cooperate with the various mobile control modules (22) secured to the transporting units (15) as soon as the mobile control modules (22) are moved past the stationary control modules (21). Stored in each mobile control module (22) is a sequence program arranged in steps, from which the next as-yet-uncompleted step is transmitted, upon the passage of the transporting units (15) past a stationary control module (21), from the mobile control module (22) of the transporting units (15). In accordance with this datum, a work operation at the associated station (18, 19, 20) is then triggered or inhibited.

23 Claims, 5 Drawing Sheets

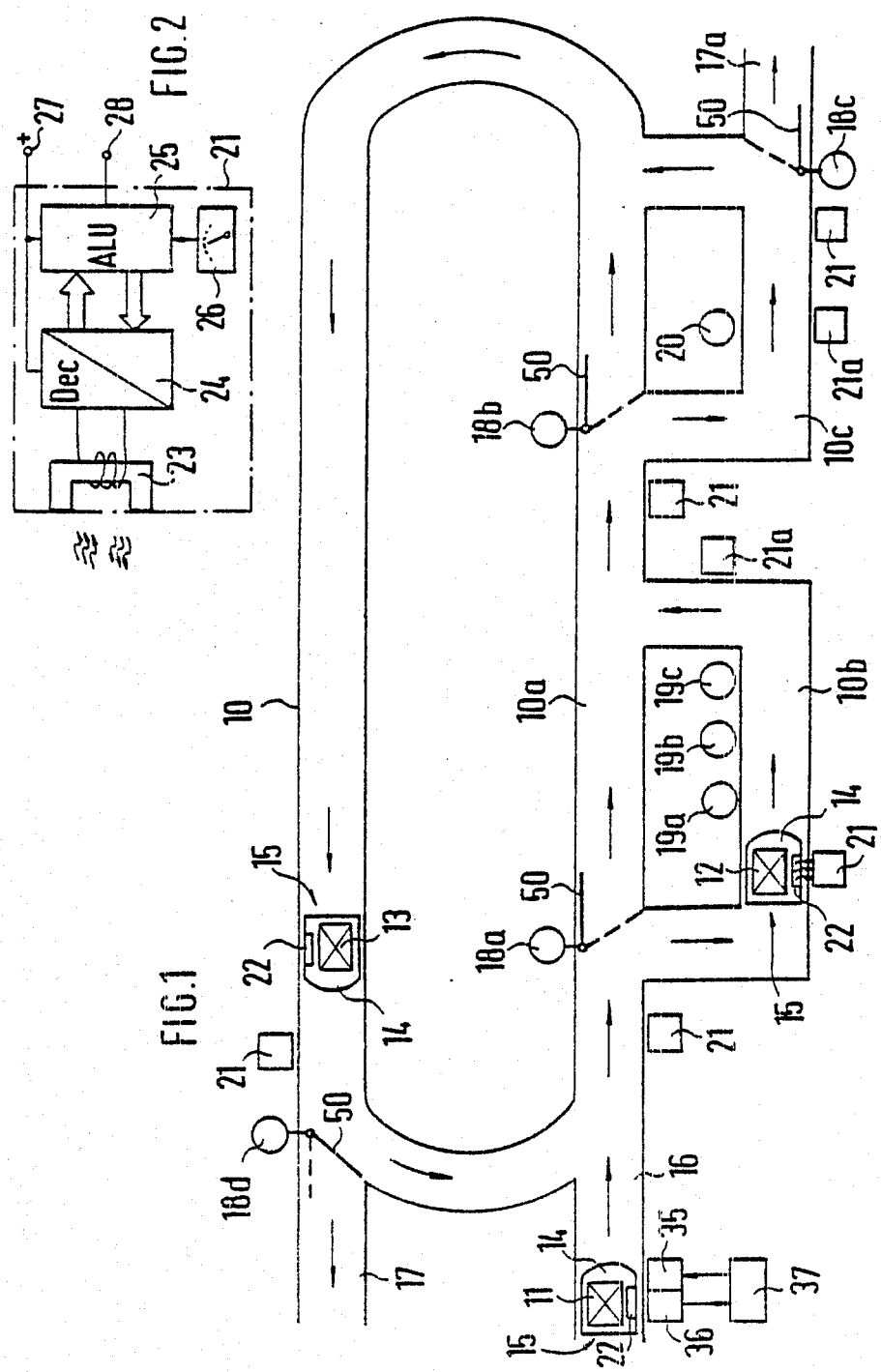

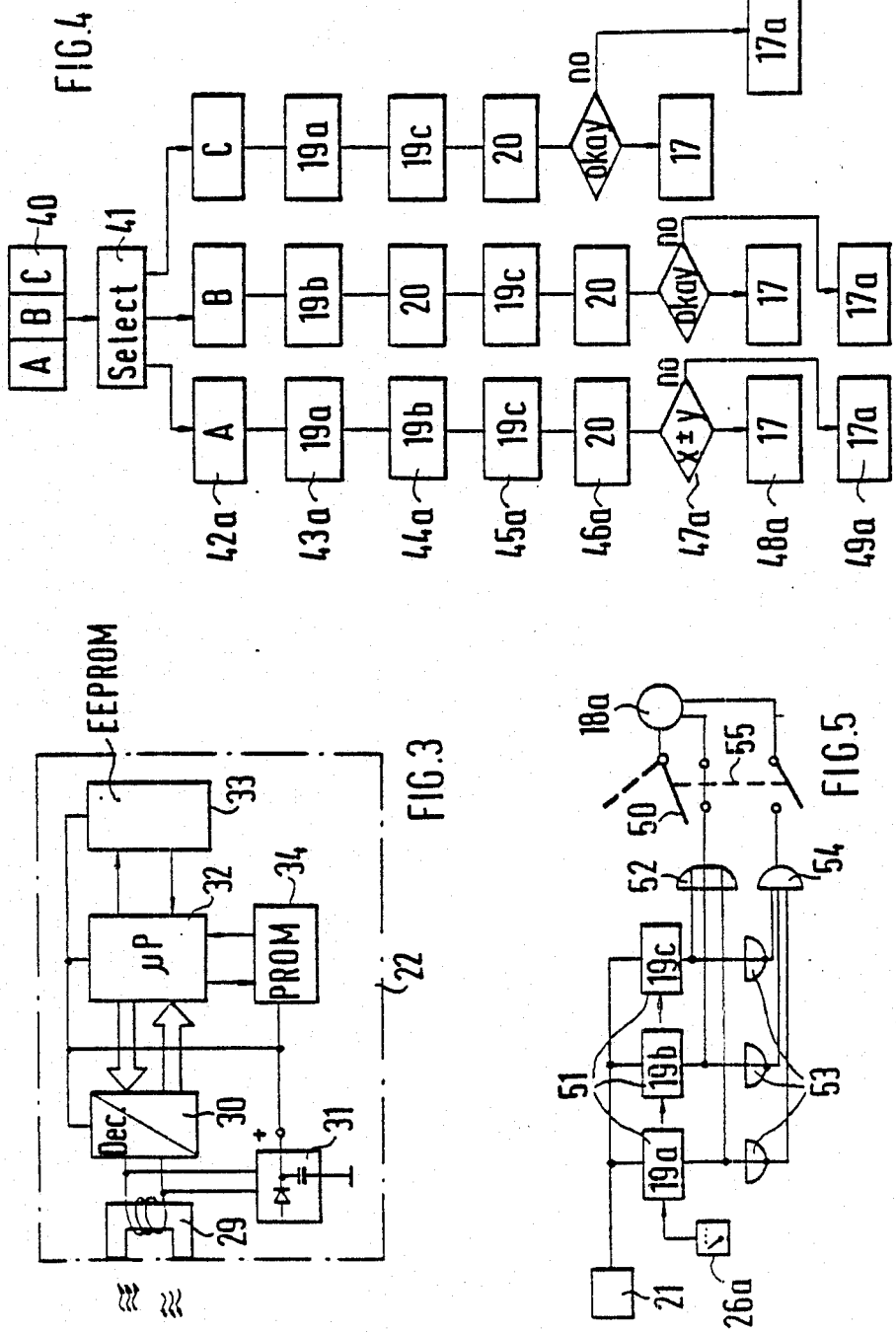

CONTROL SYSTEM FOR MOBILE TRANSPORTING UNITS ON TRANSPORTING LINES

FIELD OF THE INVENTION

The invention is based on a control system for mobile transporting units for transporting respective workpieces on a transporting line defining a plurality of paths along which the transport units can be guided past a number of work stations for performing respective work operations.

BACKGROUND OF THE INVENTION

In a known control system of this kind (published German patent application DE-OS No. 32 34 345), for the machining of workpieces, mobile control modules, as information carriers with programmable memories, are secured to workpieces or workpiece carriers. The information stored there can be read out in a contactless manner by means of stationary control modules, as so-called reading and writing stations in the vicinity of the production line from the mobile control modules. With the known system, it is also possible to perform an exchange of information between the mobile and stationary control modules on the transport line, in such a manner that as machining of the workpieces progresses, the machining status at a given time is recorded in a memory block of the mobile control module associated with the workpiece, and this machining status can then be read out by the stationary control module past which the mobile control module passes later. The stationary control modules of the reading and writing stations are connected for production control with a central control point, in which the information is processed as it is received, and both the routes and the machining sequence of the individual workpieces in the production line are controlled. For identification of each workpiece, the workpiece carrier is provided with an identity datum recorded permanently in its mobile control module, and this datum is detected at the various reading stations as soon as the workpiece carrier moves past them. In this manner, the central control point can monitor and control the route of each workpiece carrier.

Such arrangements have the disadvantage, however, that for the central control point, the electronics necessary for all the data management as well as for controlling and monitoring the various workpieces and the individual production and routing stations is very expensive. If a plurality of workpiece carriers are in transit on the production line, then various mobile control modules may arrive at various reading stations at the same time, so that the exchange of information and the processing of information by the central control is no longer assured. Furthermore, the sequence of production can be ruined, for example by the removal of one workpiece carrier from the production line at one point and its reinsertion at some other point, because the position of the workpiece carrier registered in the central control point then no longer agrees with the actual position. The changes must then be corrected by making a manual intervention at the central control point.

SUMMARY OF THE INVENTION

With the present invention, the goal is to decentralize information gathering in the overall control system and thus to make the course of various machining sequences, the order of the various stations, and specified destinations of the various transporting units as simple, flexible, fast and reliable as possible, to suit it for universal application.

The proposal according to the invention has the advantage that with the intelligent control logic provided in their mobile control module, in dialog with the stationary control modules on the transporting line, the transporting units can themselves seek their own route, which corresponds to the sequence program in the associated mobile control module. A central control point for processing all the information and for controlling the individual stations on the transporting line is no longer required. The various control commands are given directly by the transporting units to the stations of the transporting line through which the modules travel in succession. With this control system, especially in extensive production plants and with production stations that can be retooled automatically, it is possible to simplify the control processes and make them more flexible. The mobile control modules assume an active role, in that each mobile control module of one transporting unit, in dialog with the stationary control modules on the transporting line, indicates the next destination in succession, in the form of a datum. The energy required for data transmission is preferably transmitted in a contactless manner, known per se, by the stationary control modules to the mobile control module passing by, and thereby at the same time triggers the emission of the updated destination information at the mobile control module. It is also possible by the transmission of the associated destination information to give commands for retooling to the next machining station via the stationary control module. In this manner various production sequences can be programmed in an arbitrary order individually for each workpiece, by means of corresponding sequencing programs in the mobile control modules of the transporting unit. By means of a small microcomputer in the mobile control module and a limited logic in the stationary control modules, it is possible to produce these modules at low cost and great operational reliability.

A particularly advantageous control is attained if at the station at which a transporting unit is arriving a work operation is triggered only whenever the information emitted by the mobile control module of the transporting unit agrees with a fixed datum associated with the station for triggering a work command. Each machining operation is encoded by means of a predetermined fixed datum, such as a code number. The fixed data are impressed, via hexadecimal-encoded microswitches, onto those stationary control modules, or the stations associated with them, that are capable of performing the particular work operations. In this manner, the station at which a transporting unit has arrived is activated only whenever it is in the position to execute the step of the sequence program emitted by the mobile control module, for example, a particular machining operation on the workpiece of the transporting unit. On the other hand, the transporting unit travels through a station without triggering a work operation, whenever the information emitted by the mobile control unit does not agree with the work operations to be performed by that station.

For standardizing the stationary control modules and also the mobile control modules, and to increase the flexibility of the overall control system, it is advantageous if the stationary control modules and the mobile control modules are each equipped with a transmitting and receiving unit by way of which the dialog takes place and with which the stations, after the completion of one work operation, transmit a checkoff datum via a stationary control module associated with it to the mobile control module of the transporting unit located at the station. This checkoff datum indicates that a particular step of the sequence program stored in the mobile control module has been passed through. The checkoff data are stored in memory in the mobile control module and upon inquiry provide information on the steps already performed in the entire sequence program, as well as the order in which they were performed. The checkoff datum can advantageously also be used for indexing the sequence program stored in the mobile control module by one step and to call up the information for the next destination command or for the next step of the sequence program.

If the control system according to the invention is used in production lines, the stations are embodied for example as routing, machining and/or measuring stations, and the transporting units for example comprise a workpiece carrier having a workpiece that is to be machined and that moves on the transporting line in a predetermined direction from one station to the next.

BRIEF DESCRIPTION OF THE DRAWINGS

Exemplary embodiments of the invention are shown in the drawing and will be described in greater detail in the ensuing description.

FIG. 1 is a schematic layout of a transporting line having a control system according to the invention, for machining various workpieces with the aid of various work sequences with the required routing, machining and/or measuring stations;

FIG. 2 shows a block circuit diagram of the stationary control module;

FIG. 3 is a block circuit diagram of a mobile control module;

FIG. 4 shows a plurality of sequence programs, of which one selected program is input into each mobile control module;

FIG. 5 shows a coincidence circuit for triggering a routing station;

DESCRIPTION OF THE PREFERRED EMBODIMENTS OF THE INVENTION

Figure 6:
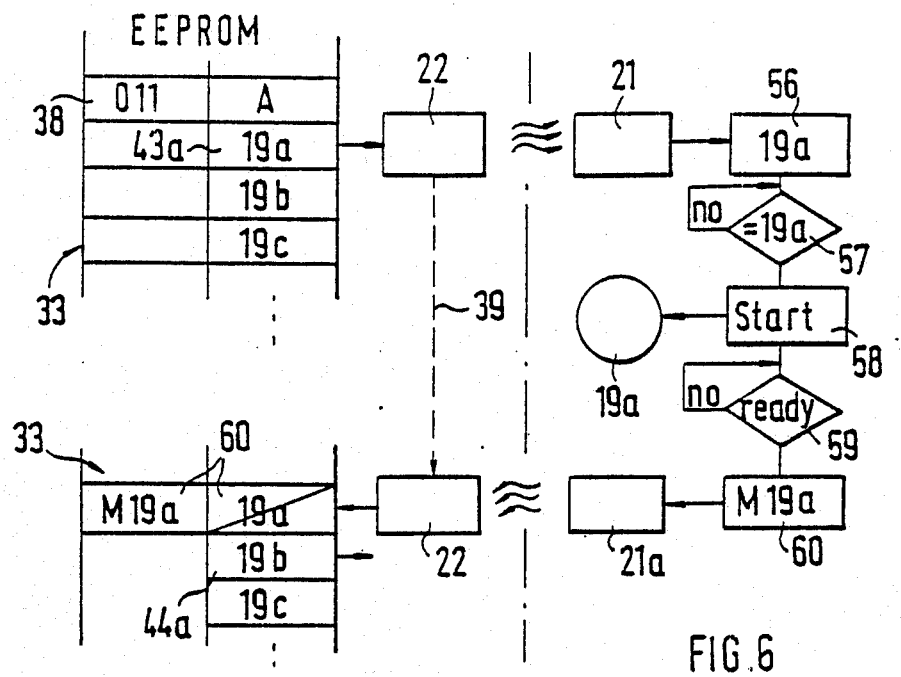
FIG. 6 shows a sequence diagram for the operations taking place at a simple machining station.

In order to describe the control system according to the invention, the transporting line of a production process for various products is shown at 10 in FIG. 1. The products comprise workpieces 11, 12, 13, which are each mounted on one workpiece carrier 14. Each combination of a workpiece carrier and a workpiece forms a transporting unit 15, and the transporting units 15 are moved on the transporting line 10 in the direction of the arrows. The transporting line 10 comprises a self-contained main loop 10a with secondary loops 10b, 10c, with an entrance 16 for the workpiece carriers 14 having new unmachined workpieces, an exit 17 for workpiece carriers 14 with finished workpieces, and a further exit 17a for workpiece carriers 14 with defective workpieces or workpieces that have been defectively machined. A plurality of stations are disposed on the transporting line 10, classified as routing stations 18, machining stations 19 and a measuring station 20. Each station has a stationary control module 21 assigned to it, which is mounted at one side of the transporting line 10 at the level of the associated station, or shortly before it. A mobile control module 22 is mounted on each workpiece carrier 14 at the same height, and the mobile control module is moved along with the workpiece carrier 14 in the direction of the arrow, closely past the stationary control modules 21.

The block circuit diagram shown in FIG. 2 of a stationary control module 21 includes a high-frequency converter 23 with a decoding stage 24 connected to it, a control logic 25, which may also be embodied as a microcomputer, and an input means 26 for fixed data. The stationary control module 21 also has a current supply means 27 and a control connection 28, by way of which the stationary control module 21 can be connected to the station associated with it for the exchange of information and commands. The stationary control module 21 embodies a transmitting and receiving unit, which is capable of entering into dialog with the mobile control modules 22 via the converter 23. The high-frequency transmission of information is indicated by wavy arrows.

The block circuit diagram shown in FIG. 3 for a mobile control module 22 also contains an HF converter 29, to which the HF oscillation of a stationary control module 21 can be coupled in. Connected to the HF converter 29 is a decoding stage 30 as well as an energy supply stage 31. A microprocessor 32, for the exchange of information, is connected to the decoding stage 30, to an overwritable memory 33, such as an EEPROM, and a fixed value memory 34 (PROM). The supply of energy to the individual stages is effected as the mobile control module 22 travels past, to a stationary control module 21 via the energy supply stage 31. If needed, the memories 33 and 34 could also be supplied by a permanently built-in round cell. Data transmission between the stationary and mobile control modules 21 and 22 can be effected for example by varying the HF oscillation, as known from DE-OS No. 33 31 694 or DE-OS No. 32 34 345.

In the control system according to FIG. 1, there is a stationary input unit 35 at the entrance 16 of the transporting line 10, and next to it a stationary reading point 36. The two are connected to a program selector 37, which in the embodiment described here is intended to contain three different sequence programs A, B and C. The three sequence programs, as shown in FIG. 4, are broken down into individual program steps. It is also arranged in the present embodiment that the workpieces are to be moved through the transport line 10 and machined at the various stations in the manner prescribed as follows: workpiece 11 with program A, workpiece 12 with program B and workpiece 13 with program C. All the workpieces that are to be machined according to program A are set on a workpiece carrier 14, which has an optically recognizable identity mark for program A. In a corresponding manner, all the workpieces that are to be machined according to program B or C are secured to corresponding workpiece carriers having the identity labels of programs B or C. The identity marks represent code informations for the selection of the sequence program required.

Figure 7:
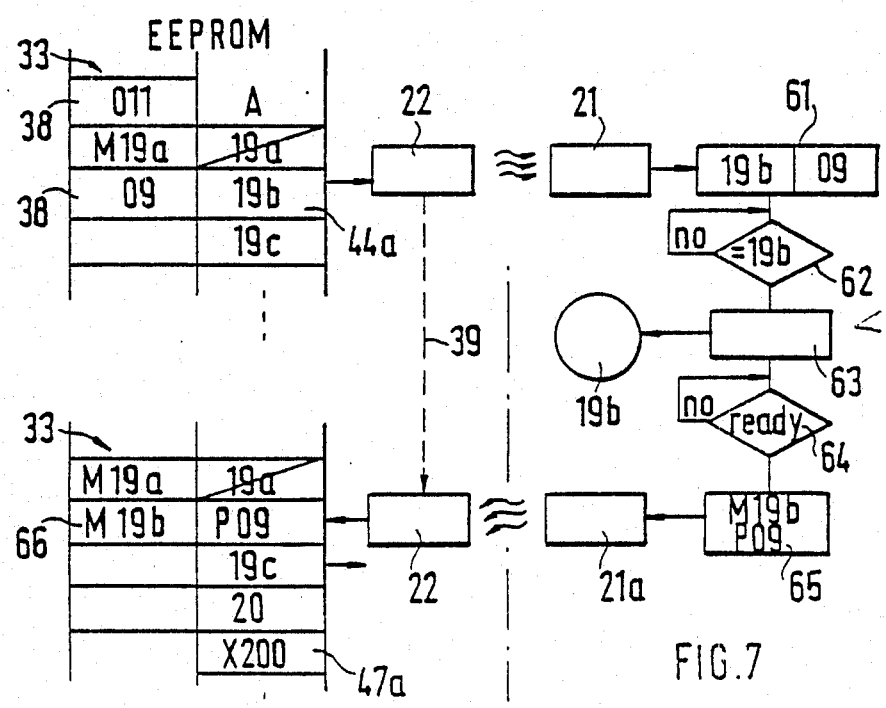
FIG. 7 shows a sequence diagram for the operations that arise at a machining station having a plurality of work programs.

As FIG. 4 shows in combination with FIG. 1, as the workpiece carriers 14 travel past the reading point 24, the program identity marks are read by the reading point in a first step 40 and transmitted to the program selector 37. The program label marks may be read optically, mechanically, inductively or as binary high-frequency signals by the reading point 36, or read out of the mobile control module 22 of the workpiece carrier 14. In the latter case the program identity mark is contained in the fixed value memory 34 of the mobile control module 22 in the form of binary data, and it is called up by a suitable interrogation signal of the reading point 36. In the example described, as shown in FIG. 4, the program identity mark A is read out at the reading point 36 from the mobile control module 22 of the workpiece carrier 14 having the workpiece 11, and the program selector 35, at step 41 (FIG. 4), selects the sequence program A from among the existing programs, in order to transmit it in the next step 42a via the input unit 35 to the mobile control module 22 in the form of a binary signal train. In the mobile control module 22, the sequence program A and its identity mark (identification) is stored in the memory 33. The mobile control module 22 is also loaded via the stationary input unit 35 with specific additional information on the workpiece 11 to be machined, for example a part number or type number, which is also stored in the form of binary data in the memory 33 of the mobile control module 22. Finally, the workpiece carrier 14 can also be provided with a code number, which is stored as binary data in the memory 33 of the mobile control module 22. This additional information stored in the memory 33 in addition to the sequence program serves as identification of the particular transporting unit or of each workpiece that is located on the transporting line 10. In FIG. 6 and 7, for example, as additional information 38, the part number 011 of the workpiece 11 has also been input by the input unit 35 in addition to the sequence program A. The input unit 35 may also optionally be equipped with a testing unit, with which the sequence program that has been input is once again called up from the mobile control module 22, in order to monitor it for correctness and completeness by comparison with the selected sequence program.

The flow diagram of FIG. 4 shows the disposition of the three different sequence programs A, B and C. In the sequence program A, the workpiece 11 in FIG. 1 is intended to move first to the machining station 19a, then to the machining station 19b, then to the machining station 19c and finally to the measuring station 20 before it finally exits from the production line 10 at the exit 17 or 17a. On the other hand, the workpiece 12 is to be machined in accordance with sequence program B, arriving first at the machining station 19b, then the measuring station 20, then the machining station 19c and again at the measuring station 20 before then leaving the production line via the exit 17, 17a. The workpiece 13 is intended to be machined in accordance with sequence program C. It is intended to move first to the machining station 19a, then the machining station 19c and finally the measuring station 20, before it leaves the production line 10 via the exit 17 or 17a.

The route of the workpiece 11 on the production line 10 will now be traced, the mobile control module 22 of this workpiece having been loaded with the sequence program A at the input unit 35. The workpiece carrier 14 having the workpiece 11 moves first in the direction of the arrow to the next stationary control module 21, and upon reaching it is activated by it by means of a high-frequency oscillation. As a result, the first program step 43a (FIG. 4) is called up from the stored sequence program A, and is transmitted in the form of a binary datum from the mobile control module 22 to the stationary control module 21. The binary datum includes the code number of the machining station 19a, which is the first destination to be headed for. At the station 19a, only one particular machining operation or one particular machining sequence is to be performed on the workpiece 11. The code number of the station 19a is therefore at the same time the code number for the machining of the workpiece 11 to be done there.

In this embodiment, the first stationary control module 21, which the transporting unit 15 having the workpiece 11 heads for, is associated with the routing station 18a, the shunt 50 of which, in the position shown, allows the transporting units 15 to pass in the direction of the arrow. However, the shunt 50 is pivoted by a work operation at the routing station 18a into the position represented by broken lines, as soon as this station receives an according work command. By means of a second work command, the shunt 50 can be pivoted back into its initial position. For triggering the switchover of the shunt, two groups of station code numbers, by way of example, are impressed on the routing station 18a, and they are activated in alternation each time the shunt is switched over. In the shunt position shown, the switchover of the shunt 50 must take place whenever the destination transmitted from the mobile control module 22 of the workpiece carrier 14 to the stationary control module 21 is the code number of one of the machining stations 19a, 19b or 19c in the secondary loop 10b. The first group thus includes all the station code numbers of the stations located in the loop 10b. For the second group, the code numbers of all the other stations can be input.

FIG. 5 shows a coincidence circuit in which in the simplest case the first group of station code numbers are realized by three coincidence stages 51, upon which the code numbers of the machining stations 19a, 19b and 19c are impressed by an input of fixed data. The fixed data are set by hand via hexadecimal-encoded microswitches 26a. The outputs of the coincidence stages 51 are joined and sent to an OR gate 52. Instead of a second group of coincidence stages, in this case the outputs of the coincidence stages 51 are delivered via inverters 53 to an AND gate 54. Via a reversing switch 55, as a function of the shunt position, the output of the OR gate 52 or of the AND gate 54 is switched through to the routing station 18a. The gates 52 and 54 thus form output stages by way of which the particular work commands triggered there reach the station 18a connected with them. According to FIG. 5, the coincidence circuit is disposed on the particular station 18a associated with it and is programmable with the microswitches 26a. However, it is also possible for the coincidence circuit to be contained in the stationary control module 21 as shown in FIG. 2, in which case particular work commands are fed directly, as the output via the control connection 28, to the station associated with this module. In the exemplary embodiment being described here, the information emitted by the mobile control module 22 for the workpiece 11 to the stationary control module 21 of the routing station 18a in program step 43a is the code number of the machining station 19a. This code number agrees with the first of the three station code numbers, which is impressed on the first coindicidence stage 51 of the coincidence circuit of FIG. 3. Consequently, the routing station 18a receives a work command via the output of the first coincidence stage 51 and the OR gate 52, by means of which command the shunt 50 is pivoted into the position represented by broken lines. The workpiece carrier 14 now moves into the secondary loop 10b, where it finally reaches the next stationary control module 21. Because it has not yet traveled through the machining station 19a, the same information continues to be transmitted to the stationary control module 21 and is passed on from there to the machining stations 19a, 19b and 19c.

FIG. 6, in a flow chart, shows the various operations that take place as the workpiece carrier 14 having the workpiece 11 passes through the machining station 19a. First, from the sequence program A stored in the memory 33 of the mobile control module 22, the destination 19a is transmitted as information in the first program step 43a to the stationary control module 21. This destination is first decoded at the stationary control module 21, in step 56, and in the next step 57 is monitored for coincidence with the code number 19a as the fixed data of the station 19a, and if there is coincidence then in step 58, by means of a control command, a work operation or work sequence is triggered at the machining station 19a, if this station is free. The workpiece carrier 14 is thus stopped at the station 19a, and the workpiece 11 is machined in accordance with the particular machine program. After that, the workpiece 11 along with the workpiece carrier 14 is released again, and it moves within the secondary loop 10b in the direction of the arrow. In step 59, the completion of the work operation at station 19a is detected, and in step 60 a checkoff datum is released at the next stationary control module 21a. The checkoff datum here comprises the machine code number M19a. Now as soon as the mobile control module 22 moved in the direction of the arrow 39 reaches the stationary control module 21a, this checkoff datum is transmitted to it. This datum is stored in step 60, along with the sequence program A in the memory 33 of the mobile control module 22. With this checkoff datum, in the example being described, the completed step 19a of the sequence program A is simultaneously erased and the next step 44a of the sequence program A is called up. This step includes as information the code number 19b of the machining station 19b as the next destination. In order to economize on memory locations in the memory 33, instead of erasing the completed step 19a of the completed sequence 19a, this step can also be overprinted with the checkoff datum.

As the process continues, the workpiece carrier 14 having the workpiece 11 now reaches the next stationary control module 21, which is associated with the routing station 18b. For switching over the shunt of this routing station 18b, the code number of the measuring station 20 in the secondary loop 10c is impressed on the shunt. However, since the information emitted by the mobile control module 22 of the workpiece 11 includes the code number of the machining station 19b, this does not agree with the impressed code number of the routing station 18b. Consequently, the shunt 50 is not switched over, and the workpiece carrier 14 travels through the routing station 18b without tripping a work or switchover command. It now travels in the course of the main loop 10a of transporting line 10 to the next stationary control module 21, which is associated with the routing station 18d. In the position of the shunt 50 shown, the code number of the exit 17 is impressed on this station. Since this code number does not agree either with the information emitted by the mobile control module 22, the shunt 50 is not switched over, and the workpiece carrier 14 now returns to the routing station 18a. If this station has not been switched back again in the mean time by other mobile control modules 22, then the shunt 50 is still in its position represented by broken lines. Since the mobile control module 22 having the workpiece 14 furthermore, in step 44 of the sequence program A, continues to emit the code number of the machining station 19b to the stationary control module 21, the AND conditions at the gate 54 (FIG. 5) are not satisfied, and the shunt 50 is accordingly not switched over. The workpiece carrier 14 having the workpiece 11 now moves back into the secondary loop 10b of the transporting line 10. Via the next stationary control module 21, the machining station 19b is now activated.

FIG. 7 shows a sequence diagram for the operations taking place at the station 19b. The machining station 19b is capable of performing a plurality of machining programs or various individual machining operations. The individual work operations or work programs in the entire system have permanently predetermined program code numbers. In addition to the sequence program A in the memory 33 of the mobile control module 22, as further additional information 38, the code number of the particular desired machining program is also input at the input unit 35. In the example being considered, the machining program having the code number 09 is to be performed at the station 19b. Now as soon as the mobile control module 22, in step 44a of the sequence program A, emits the station code number 19b as information to the stationary control module 21, the code number 09 for the desired machining program is simultaneously emitted as well. In step 61, both code numbers are detected by the stationary control module 21, and in step 62 the code number 19b is monitored for coincidence with the impressed station code number for the station 19b. In step 63, the machining program 09 is now called up at the station 19b. The station is optionally retooled and the workpiece 11 is now machined in accordance with the program 09 that has been called up. In step 64, the completion of the machining program 09 is ascertained, and in step 65 a checkoff datum is emitted to the next stationary control module 21a. After the machining of the workpiece 11, it is released by the station 19b again, and the mobile control module 22 of the workpiece carrier 14 now moves in the direction of the arrow 39 to reach the stationary control module 21a, where the checkoff datum is now received. The checkoff datum here contains not only the machine code number M19b but also the program code number P09. In step 66, both code numbers are stored in the memory 33 of the mobile control module 22, and the completed step 19b of the sequence program A is rewritten with the code number of the work program P09. Furthermore, the sequence program A for the workpiece 11 is thereby once again indexed forward by one step.

Since in the next step 45a of the sequence program A (FIG. 4), the information transmitted by the mobile control module 22 of the workpiece 11 to the next stationary control modules 21 is the code number of the machining station 19c, the workpiece carrier 14 having the workpiece 11 now moves once again through the main loop 10a of the transporting line 10. Moving past the routing stations 18b, 18d, and 18a it finally reaches the machining station 19c. There the workpiece 11 is further machined in the same manner as described in detail in FIG. 6 or FIG. 7, and then the sequence program A is indexed forward with a further checkoff datum to the next step 46a. Thus the code number for the measuring station 20 is now received by the mobile control module 21 of the workpiece 11 at the stationary control module 21 for the routing station 18b. Because this information agrees with the station code number impressed on the routing station 18b in this shunt position, the shunt 50 is pivoted into the position represented by broken lines, and the workpiece carrier 14 having the workpiece 11 enters the secondary loop 10c. Upon reaching the next stationary control module 21, the code number emitted by the mobile control module 22 activates the measuring station 20, and the workpiece 11 is measured there.

Figure 8:
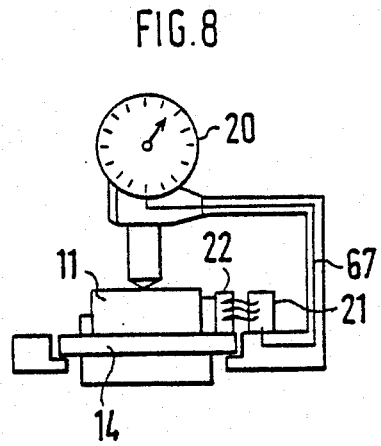
FIG. 8 shows a measuring station on the transporting line.

FIG. 8 shows the measuring station 20, at which the height of the workpiece 11, for example, is measured. Via an electrical connection 67, the measured value is emited in the form of a digital signal to the stationary control module 21 and from there is transmitted to the mobile control module 22.

Figure 9:
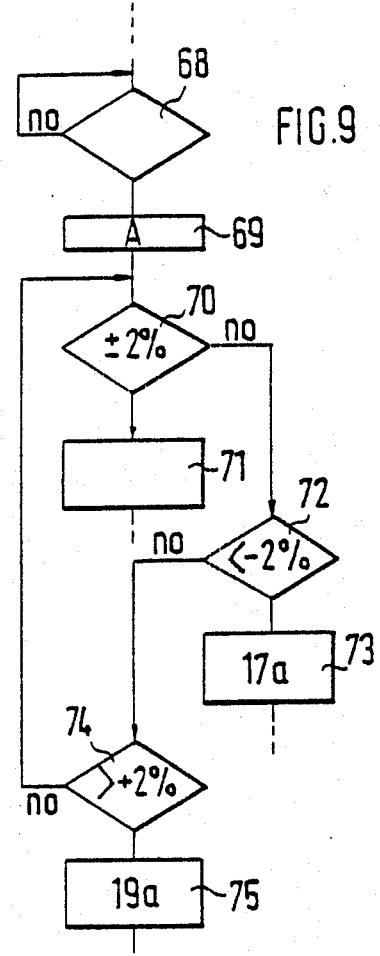
FIG. 9 shows a flow diagram for evaluating a value measured at the measuring station.

FIG. 9, in a flow diagram, shows the evaluation of the measured value ascertained at the measuring station 20 by means of a subroutine in the mobile control module 22. In step 68, the arrival of the measured value is first awaited. In step 69, the measured value is first stored temporarily, and the code number 20 is also erased in the sequence program A. The sequence program A is thus indexed on to the next step 47a (FIG. 4). As FIG. 7 shows, the set-point value X200 in the sequence program A is stored in the memory 33, after the code number 20, and this set-point value X200 is now called up in step 47a. In the next step 70 of the subroutine according to FIG. 9, it is now monitored whether the measured value is within the permissible tolerances of ±2% with respect to the set-point value X200. If this is the case, then in step 71 the measured value is stored in the memory 33 beside the set-point value. Next, the sequence program A is continued in step 48 (FIG. 4). If the measured value is not within the tolerance limits, then in step 72 of the subroutine of FIG. 9 it is determined whether the dimension is smaller than permissible. Since in that case further machining is no longer possible, in the next step 73 the code number 17a of the exit 17a is input into the memory 33 as a new destination for the sequence program A, to remove the workpiece 11 from further production. However, if the measured value does not fall below the tolerance limit, then it is monitored in step 74 whether the measured value is greater than permissible. If that is not the case either, then step 70 contains an incorrect report, and the program consequently jumps back to step 70. If an overly large measured value is ascertained in step 74, however, then in the next step 75 the code number of the station 19a, or of some other station that can perform remachining of the workpiece 11, is recorded in the memory 33 as the next destination for the sequence program A.

If remachining of workpieces is no longer possible, then it is sufficient in step 47a of the sequence program A of FIG. 4 merely to compare the measured value with the set-point values X and the permissible tolerances ±Y, which as additional information were input along with the sequence program A into the mobile control module 22 at the input unit 35. If the measured values are outside the permissible tolerances, then the sequence program A is indexed further to the step 49a having the code number of the exit 17a, to isolate the workpiece. Contrarily if the measured values are within the tolerance limits, then the sequence program A is indexed in the next step 48a to the code number of the exit 17.

In this case the routing station 18c must be activated in order to pivot the shunt 50 into the position shown in broken lines. To do this as simply as possible, a coincidence circuit according to FIG. 5 having only one coincidence stage 51 and only one inverter 53, the input and output of which are each connected to one contact of a reversing switch 55, is sufficient. The coincidence stage 51 of the routing station 18c has impressed on it only the code number of the exit 17a as fixed information. With the code number of the other exit or other stations, no signal is consequently emitted via the coincidence stage 51 arranged in this way. In the position shown of the shunt 50, the contact of the reversing switch 55 at the output of the inverter 53 is closed. Thus by means of the code number of the exit 17, the routing station 18c is activated by the mobile control module 22, and the shunt 50 is pivoted into the position represented by broken lines. The workpiece carrier 14 having the workpiece 11 now returns to the main loop 10a of the transporting line 10, and at the routing station 18d the code number 17 of the exit 17 is transmitted as the destination by the mobile control module 20 of the workpiece 11 to the stationary control module 21 of the routing station 18d. Since the coincidence circuit of the routing station 18d, in the position shown of the shunt 50, has impressed on it the code number of the exit 17, the shunt is now pivoted into the position shown in broken lines, and the workpiece carrier 14 having the workpiece 11 leaves the production line 10 via the exit 17.

In the same manner, the workpiece carrier 14 having the workpiece 12 seeks its route on the transporting line 10 according to the sequence program B. The workpiece 12 is first moved via the routing station 18a to the machining station 19b, where it is machined in the intended manner. It then moves via the routing station 18b to the measuring station 20, where it is measured a first time. Then it moves via the main loop 10a of the transporting line 10 back to the secondary loop 10b where it is now machined by the machining station 19c, and then once again moves to the measuring station 20. Depending on whether the values measured there are inside or outside the permissible tolerances, the workpiece 12 is now sent via the routing station 18c to the exit 17a and removed, or is steered via the routing station 18d to the exit 17.

A further sequence program C is to be run through by the transporting unit 15 having the workpiece 13. This sequence program again was initially loaded into the mobile control module 22 of the workpiece carrier 14 having the workpiece 13 at the entrance 16 via the input unit 35. Following the program C, the workpiece carrier 14 having the workpiece 13 now moves first via the routing station 18a into the secondary loop 10b and from there to the machining station 19a. After that the workpiece 13 is first machined by the machining station 19c as well, and then reaches the measuring station 20 via the routing station 18b. Based on the values measured there, a decision is now made by the mobile control module 22 as to whether the workpiece 13, having the required dimensional accuracy, should be moved via the routing station 18d into the exit 17, or has inadequate dimensional accuracy and should be moved via the routing station 18c into the exit 17a.

By means of the dialog between the stationary control modules 21 on the transporting line 10 and the mobile control modules 22 on the workpiece carriers 14, it is possible for each work piece to be delivered in an individual sequence to the various stations within the transporting line 10. All that is required is that a suitable sequence program be prepared and stored in the mobile control module 22 of the particular workpiece. With the aid of this sequence program, each transporting unit then seeks its own optimal route, in dialog of the mobile control module 22 with the stationary control modules 21 on the transporting line 10.

Figure 10:
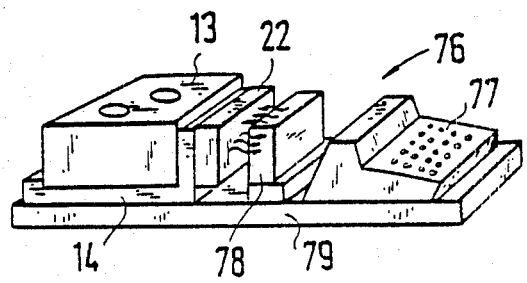
FIG. 10 shows a testing station for the stored sequence program of one transporting unit.

To increase the flexibility of the control system, it is also efficacious to provide a monitoring station, at which the portion of the sequence program already performed is called up from the mobile control module of a transporting unit 14 [sic], and the portion not yet performed is added to or corrected. In FIG. 10, a monitoring station of this kind is shown. The testing station 76 is here disposed outside the transporting line 10 and is equipped with an electric typewriter 77 as an input apparatus. It also has a reading and input unit 78 and a support 79 for the workpiece carrier 14 having the workpiece 13 that is to be monitored. In the example under consideration here, the station 19c of the system of FIG. 1 is non-functional, and the work operation to be performed by that station will now be taken over by the station 19b. In order to accomplish this, the workpiece carrier 14 having the workpiece 13 is removed from the transporting line 10 and inserted at the testing station 76. From the mobile control module 22 of the transporting unit 14 [sic], in dialog with the reading and input unit 78, the portion of the sequence program C that has already been completed is called up there, and the portion not yet completed is corrected by hand using the typewriter 77, by replacing the code number 19c in the sequence program C with the code number 19b in the memory 33. Next, the workpiece carrier 14 and workpiece 13 is put back on the transporting line 10 at some arbitrary point, and from there it seeks its own route to the station 19b.

Figure 11:
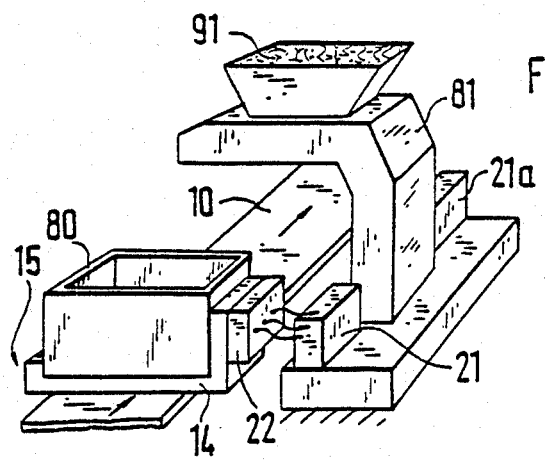
FIG. 11, as a further embodiment, shows a transporting unit having a materials container as it passes by a refilling station.

In a further exemplary embodiment of the invention, shown in FIG. 11, the transporting unit 15 comprises a workpiece carrier 14, on which a container 80 is disposed. Materials or substances that are required at various stations of the transporting line 10 can be placed in the container. In the example here, the container 80 is filled with a number of screws, which are for example needed at the machining station 19b of FIG. 1 and at other stations, not shown there. In this case, via the input unit 35 a sequence program is input into the mobile control module 22, which includes the various stations that are to be supplied with screws and which are to be passed through cyclically. At the corresponding stations of the transporting line 10, the particular quantities of screws needed are taken from the container 80. To provide that the container 80 is always refilled at the proper time, it is necessary for not only the sequence program of the mobile control module 22 associated with the container 80 but also the type and amount of the material or substance contained in the container 80 to be stored in the memory 33 as further information. To this end, a subroutine is called up in the mobile control module 22 by the checkoff datum at every station where material is taken from the container, and this subroutine monitors the contents of the container 80. As soon as the quantity in the container 80 drops below a predetermined value, the transporting unit 15, with the aid of the subroutine in the mobile control module 22, will move to a refill station 81 as its next destination. The stationary control module 21 of the refill station 81 will be provided with the refill command and the required refill quantity Z by the mobile control module 22.

Figure 12:
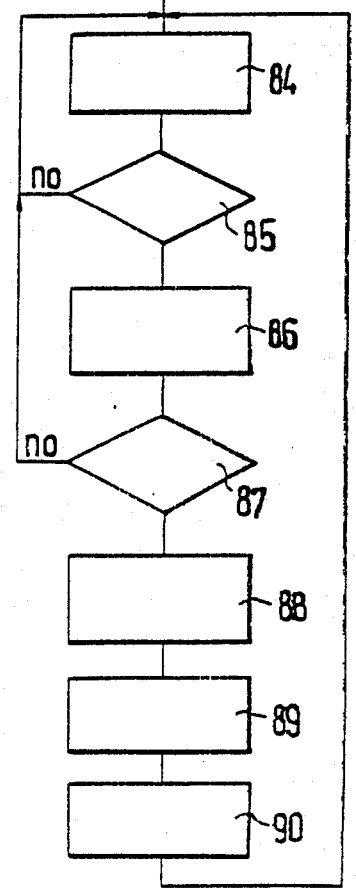
FIG. 12 shows the flow diagram of the mobile control module for monitoring the container contents.

The program required for this purpose in the mobile control module is shown in FIG. 12. In step 82, first the container 80 must be filled with a predetermined number of screws, and in step 83, via a checkoff signal, a counter in the mobile control module 22 is set to the number of screws now located in the container 80. In step 84, the sequence program having the stations that take material from the container that are to be passed through on the transporting line 10 (FIG. 1) are called up, and thus the next receiving station is headed for by the transporting unit 15. After that, in step 85, with the aid of the checkoff datum of the receiving station that was headed for, it is monitored whether screws were withdrawn from the container 80 and if so how many. If no screws were withdrawn, then the program returns to the sequence program, and the transporting unit heads for the next receiving station. Contrarily, if screws were removed, then in step 86 the counter is counted downward by the number z of screws removed. In step 87, it must now be monitored whether a lower threshold value for the number of screws in the container 80 has been reached, or whether the value has fallen below this thershold. This threshold value is also stored in the memory 33 of the mobile control module 22. As long as the threshold value has not been reached, the next receiving station in the sequence program of the mobile control module 22 is headed for. On the other hand, if the threshold value is attained or the value drops below it, then in step 88, the refill station 81 is called up as the next destination, and the transporting unit 15 now moves along the transporting line 10 to the refill station 81 in accordance with FIG. 11. Having arrived there, it is refilled with a quantity Z of screws calculated in the mobile control module 22 and transmitted in step 89 to the stationary control module 21 of the refill station 81, as long as enough screws are still contained in a refill container 91 of the refill station 81. The refilled quantity Z is finally transmitted to the mobile control module 22 of the transporting unit, via a checkoff signal of the stationary control module 21a following the refill station 81, and in step 90 the counter in the mobile control module 22 is now raised by the number Z of the screws refilled into the container 80. Finally, the program jumps in step 84 back to the sequence program, so that after leaving the refill station 81, the transporting unit 50 is again moved toward the next receiving station.

The invention is not restricted to the exemplary embodiments shown. As machining stations with a plurality of machining programs, it is for example possible to use machine tools or automatic handling equipment, in which with the aid of the sequence program of the particular transporting units, particular work steps or work sequences are called up. It is also possible to make changes in the sequence even within the transporting line, by disposing suitable input units or testing stations directly on the transporting line. In the same manner, it is also possible by means of the checkoff data at various stations, to add to or correct the portion not yet completed of the sequence program stored in the mobile control module. In sequence programs in which the individual portions or steps are not fixed from the outset in terms of their order relative to one another, it is for example possible to increase the flexibility of the control system, for the next program portion or step to be selected by a decision logic, after each step or portion has been performed, this decision logic also being contained in the mobile control module 22. In this manner, for instance referring to the flow diagram of FIG. 12, a decision can be made in step 84 by the mobile control module 22 itself as to which of a plurality of receiving stations should be headed for as the next destination.

The triggering of a work operation at the various stations of the transporting line 10 is effected, in the exemplary embodiment of FIG. 1, by a suitable datum which is received by the stationary control module 21 associated with the station as a mobile control module 22 moves past this station. Because of the coincidence testing it is assured that a work operation is triggered only whenever the associated station is capable of performing the step provided in the sequence program of the transporting unit 15. Within the scope of the invention, however, it is also possible to prevent a work operation at an associated station by means of the information transmitted by the mobile control module 22. This would be suitable whenever in so-called mixed production, a predetermined work operation is regularly performed in the normal instance at predetermined stations, but is not to be performed for a particular work piece.

Since by means of the checkoff signals of the various stations the transporting sequences as well as the measurement results and other data are stored in the mobile control module 22, then until they are erased and a new sequence program is stored in memory, they can be called up and evaluated either in part or completely at the testing stations or passed on to other memories. The dialog or transmission of information between the stationary and the mobile control modules 21, 22 can be done with any known physical methods, and contactless transmission, for example electromagnetic, optical or magnetic transmission, is preferred. The storage of the data is also performed magnetically or electrically, depending on the scope of the data. The stationary and mobile control modules are constructed such that even at a transporting speed of 0.3 m/s of the transporting units, they can still enter into a dialog with one another by means of a high-frequency information transmission. Via an interface, the stationary control modules 21 can also be connected to a standard printer or to a computer. By providing the stationary control modules 21 and 21a with the same structure, it is possible to use these modules not only directly for controlling the shunts at the routing stations and for controlling the work operations at the machining stations, but also for transmitting the checkoff data. In the mobile control modules 22, EEPROMS are preferably used as the overprintable memories 33, the information content of which is maintained even if no energy is supplied from outside to the mobile control module 22. The storage duration of the data is on the order of years here, and the range of the ambient temperature is between 0° and +40° C. By means of a metal shield, the control modules are largely protected from interference pulses or magnetic interference. The overprintable memory can also be assembled with EPROMS. The memory is then continuously supplied with current from a battery (such as a lithium cell).

The control system according to the invention can be used not only for transporting lines for the manufacture of products, for assembling or packing of products, for shipping of parts, materials or substances, but can be used in general for all transport units that move on transport routes on land or water and are to perform a predetermined sequence program.

I claim:

1. A control system for mobile transport units for transporting respective workpieces on a transporting line defining a plurality of paths along which the transport units can be guided past a number of work stations for performing respective work operations, the transporting line further having an input at which the transport units enter the line, the control system comprising:

a plurality of mobile control modules fixedly mounted on respective ones of said transport units;

a plurality of stationary control modules arranged along the paths of the transporting line at respective ones of said work stations and each of said stationary control modules being operatively connected to the work station assigned thereto so as to permit the exchange of information therebetween;

each of said mobile control modules and each of said stationary control modules having respective transmission/receiving means for contactlessly interchanging information when the transport unit passes one of said stationary control modules in its movement along a path through the transport line;

each one of said mobile control modules having a memory for storing a freely-selectable program assigned to the transport unit corresponding thereto;

a stationary inputting unit arranged at the input of the transport line for storing a preselected sequence program into the memory of each of said mobile control units for defining a sequence of steps to be completed sequentially by the transport unit and specifying the work operation to be performed on the workpiece at least one of said work stations; and, each of said stationary control modules including activation means for actuating the mobile control module of a transport unit when the latter passes the stationary control module in order to initiate the exchange of information therebetween and call up or modify a step of said program so that the work of the work station associated with the stationary control module can be performed as may be required.

2. The control system of claim 1, wherein each one of said stationary control modules includes input means for receiving and storing permanent data therein indicative of the work to be performed at the work station associated with said one stationary control module; and, said activation means including recognition means for allowing the work operation at the work station to be performed only when the information received from said mobile control module corresponds to said permanent data and to otherwise allow said transport unit to pass without causing the work of the work station to be performed.

3. The control system of claim 2, each of said stations including a coincidence circuit having at least one coincidence stage incorporating said input means which contains said permanent information and which issues a work command to the station when the information transmitted from the mobile control module of the transport unit coincides with said permanent information.

4. The control system of claim 3, said stationary control module of each of said stations, comprising said coincidence circuit, the work command being issued to the station directly via the output of said coincidence circuit.

5. The control system of claim 3, said station including a switch for manually putting said permanent information into said coincidence circuit.

6. The control system of claim 1, wherein each one of said stations, after the completion of a work operation, transmits an acknowledgement signal via the stationary control module associated therewith to the mobile control module of the transport unit located at said one station, said mobile control module including processing means for indexing said sequence program in said memory by one step in order to call up the next work station.

7. The control system of claim 6, said transport unit having a container for receiving material or substances from which partial quantities are removed at several stations along the transporting line; and, wherein, in addition to the sequence program of the mobile control module associated with the container, the type and quantity of the material or substance located in the container are stored in memory.

8. The control system of claim 7, wherein said acknowledgement signal received by the mobile control module from the stationary control module of a work station contains information as to the partial quantity removed from or added to the container at said station and from said information ascertains the remaining quantity or the total quantity disposed in the container.

9. The control system of claim 8, wherein the indication of a minimum quantity in the container is included in the sequence program of the mobile control module, and, if the quantity drops below the minimum quantity, as the next step in the sequence program the trip to a refill station is called up, and after leaving the refill station, the further steps of the sequence program are performed.

10. The control system of claim 6, said acknowledgement signal containing data relating to the station at which a work operation has just been completed, said data being stored in said memory in a recallable manner in said mobile control module and in the sequence of said program.

11. The control system of claim 10, wherein a portion of the program stored in the memory of the mobile control module of one of the transport units has been run through in moving along a path of the transport line; and, the control system further comprising: a testing station including read-out means for reading out said portion of said program from said mobile control module; and, read-in means for modifying the remaining portion of said program.

12. The control system of claims 11, wherein said testing station and said read-out means thereof are arranged outside of said transporting line.

13. The control system of claim 6, said mobile control module containing a logic circuit which, for several steps of the sequence program not predetermined as to their sequence, independently determines the next step.

14. The control system of claim 10, said acknowledgement signal containing measured values (X) of the workpiece on the transport unit because of which the portion of the sequence program not yet completed is to be changed in the mobile control module.

15. The control system of claim 1, said stationary inputting unit including means for inputting an identification into the memory of each of the mobile control modules of respective ones of said transport units.

16. The control system of claim 15, said stations including a plurality of routing stations, a plurality of machining stations and a plurality of measuring stations; and, said transport units including workpiece carriers or container carriers which move along said transporting line in a predetermined direction from station to station.

17. The control system of claim 16, said identification containing specific data of the workpiece or of the container and a code number of the workpiece carrier; and, said sequence program containing information relating to the machining sequence and the desired values to be obtained in the individual work operations.

18. The control system of claim 16, wherein said mobile control modules of said transport units, upon approaching machining stations conducting various machining programs, transmit an information from said memory via said transmission/receiving means to said stationary control modules for triggering a work operation and a supplementary information from said memory for triggering a specific machining operation.

19. The control system of claim 18, said memory of each of said mobile control modules having capacity for receiving said supplementary information together with said sequence program, said supplementary information being coordinated with specific steps of the sequence program which address corresponding ones of said machining stations.

20. The control system of claim 15, wherein the mobile control module includes an input unit and wherein said stationary inputting unit comprises a program selector for selecting one sequence program from various sequence programs with the aid of an externally inputted code information and for inputting the selected sequence program into the memory of the mobile control unit via said input unit.

21. The control system of claim 20, wherein said code information is applied to the transporting unit; and, said stationary inputting unit further comprising: stationary reading means for reading said code information from said transporting unit and for sending said code information to said program selector.

22. The control system of claim 1, said mobile control module including a logic circuit for processing: the information stored in said memory, the information received from said stationary control modules and the information transmitted to said stationary modules..

23. The control system of claim 1, said stationary control modules including energy supply means for contactlessly supplying electrical energy to said mobile control modules.

* * * * *